United States Patent
Fushimi et al.

(10) Patent No.: US 11,643,475 B2
(45) Date of Patent: May 9, 2023

(54) THICKENER, COMPOSITION, AND SHEET

(71) Applicant: OJI HOLDINGS CORPORATION, Tokyo (JP)

(72) Inventors: Hayato Fushimi, Chiba (JP); Rina Tanaka, Chiba (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 758 days.

(21) Appl. No.: 16/607,571

(22) PCT Filed: Oct. 3, 2017

(86) PCT No.: PCT/JP2017/035968
§ 371 (c)(1),
(2) Date: Oct. 23, 2019

(87) PCT Pub. No.: WO2018/198399
PCT Pub. Date: Nov. 1, 2018

(65) Prior Publication Data
US 2020/0131279 A1 Apr. 30, 2020

(30) Foreign Application Priority Data

Apr. 24, 2017 (WO) .................. PCT/JP2017/016179

(51) Int. Cl.
| | | |
|---|---|---|
| C08B 1/00 | (2006.01) | |
| C08B 5/00 | (2006.01) | |
| C08B 15/06 | (2006.01) | |
| C08J 3/28 | (2006.01) | |
| C08J 5/18 | (2006.01) | |
| C08L 1/08 | (2006.01) | |
| C08L 1/16 | (2006.01) | |
| D21H 11/20 | (2006.01) | |
| D21H 17/53 | (2006.01) | |

(52) U.S. Cl.
CPC ............... *C08B 1/003* (2013.01); *C08B 5/00* (2013.01); *C08B 15/06* (2013.01); *C08J 3/28* (2013.01); *C08J 5/18* (2013.01); *C08L 1/08* (2013.01); *C08L 1/16* (2013.01); *D21H 11/20* (2013.01); *D21H 17/53* (2013.01); *C08J 2301/08* (2013.01); *C08J 2301/16* (2013.01); *C08J 2471/02* (2013.01)

(58) Field of Classification Search
CPC ..................................................... C08B 1/003
See application file for complete search history.

(56) References Cited

U.S. PATENT DOCUMENTS 10,167,576 B2 * 1/2019 Chao .................. D06M 16/003

FOREIGN PATENT DOCUMENTS

| | | |
|---|---|---|
| JP | H07-138875 A | 5/1995 |
| JP | 2009-067910 A | 4/2009 |
| JP | 2012-214717 A | 11/2012 |
| JP | 2015-510438 A | 4/2015 |
| JP | 2015-183095 A | 10/2015 |
| JP | 2015-189698 A | 11/2015 |
| JP | 2015-221844 A | 12/2015 |
| JP | 2016-014098 A | 1/2016 |
| JP | 2016-087877 A | 5/2016 |
| JP | 2016-098488 A | 5/2016 |
| JP | 2017-066273 A | 4/2017 |
| WO | 2013/126635 A1 | 8/2013 |
| WO | 2016/186055 A1 | 11/2016 |

OTHER PUBLICATIONS

Office Action dated Jan. 11, 2022 from the China National Intellectual Property Administration in CN Machine Application No. 201780089868.5.
International Search Report and Written Opinion for PCT/JP2017/035968 dated Nov. 7, 2017.
International Preliminary Report on Patentability with English Translation of Written Opinion of the International Searching Authority for PCT/JP2017/035968 dated Nov. 7, 2019.
Extended European Search Report dated Nov. 26, 2020 from the European Patent Office in EP Application No. 17906896.0.
Office Action dated Dec. 15, 2020 from the Canadian Intellectual Property Office in CA Application No. 3,062,756.

* cited by examiner

*Primary Examiner* — Leigh C Maier
*Assistant Examiner* — Everett White
(74) *Attorney, Agent, or Firm* — Sughrue Mion, PLLC

(57) ABSTRACT

It is an object of the present invention to provide a thickener capable of exhibiting excellent light resistance. The present invention relates to a thickener comprising cellulose fibers having a fiber width of 8 nm or less and water, wherein the thickener is a slurry or a gel, and when the thickener is filled in a colorless and transparent glass cell having an inside dimension of 1 cm in depth×4 cm in width×4.5 cm in height and the thickener is then irradiated with ultraviolet rays with a wavelength of 300 nm or more and 400 nm or less, using a xenon lamp, from the side of the maximum area surface of the glass cell, so as to be an irradiance of 180 W/m² and an integrated light amount of 500 mJ/m², the amount of a change in the yellowness before and after ultraviolet irradiation measured in accordance with JIS K 7373 is 10 or less.

11 Claims, 2 Drawing Sheets

[Figure 1]
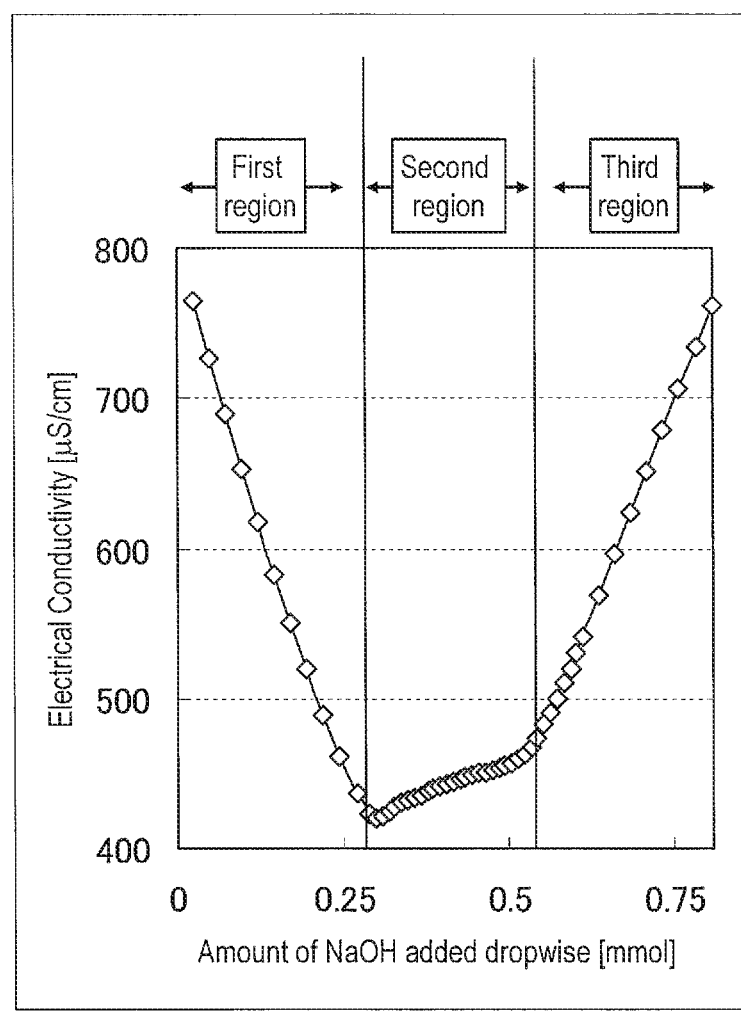

[Figure 2]
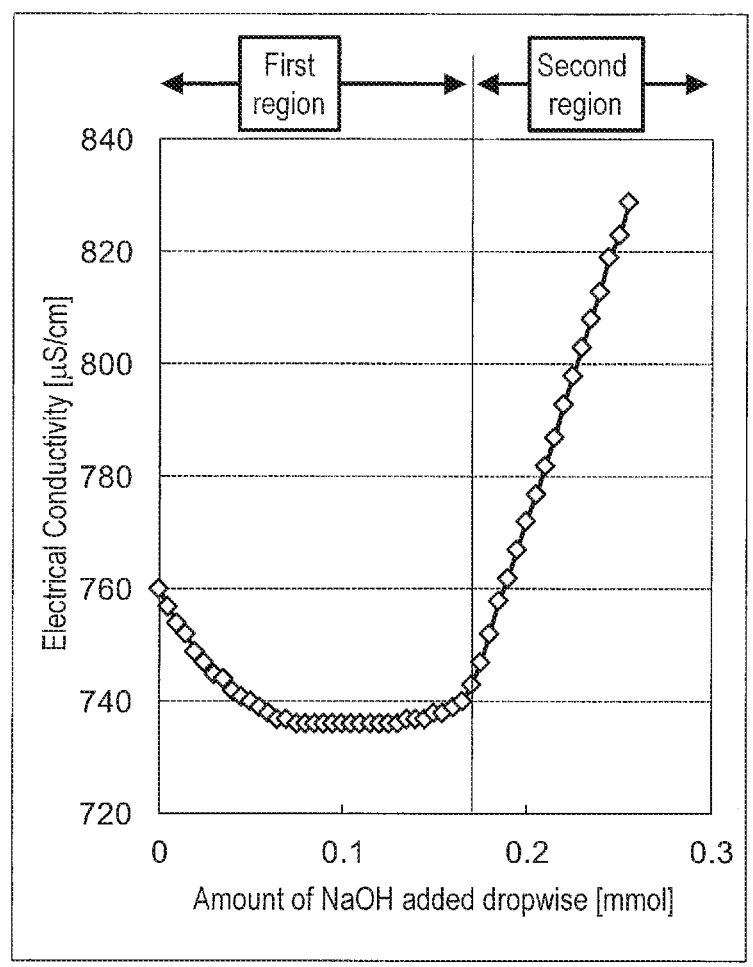

THICKENER, COMPOSITION, AND SHEET

CROSS REFERENCE TO RELATED APPLICATIONS

This is a National Stage of International Application No. PCT/JP2017/035968 filed Oct. 3, 2017, claiming priority based on International Patent Application No. PCT/JP2017/016179 filed Apr. 24, 2017.

TECHNICAL FIELD

The present invention relates to a thickener, a composition, and a sheet. Specifically, the present invention relates to a thickener, a composition, and a sheet, each comprising ultrafine cellulose fibers.

BACKGROUND ART

In recent years, because of enhanced awareness of alternatives to petroleum resources and environmental consciousness, there has been a focus on materials utilizing reproducible natural fibers. Among natural fibers, cellulose fibers having a fiber diameter of 10 µm or more and 50 µm or less, in particular, wood-derived cellulose fibers (pulp) have been widely used mainly as paper products so far.

Ultrafine cellulose fibers, which have a fiber diameter of 1 m or less, have also been known as cellulose fibers. Since ultrafine cellulose fibers can exhibit thickening action, the use of such ultrafine cellulose fibers as a thickener for various intended uses has also been studied.

For example, Patent Document 1 discloses an anionic-modified cellulose nanofiber dispersion comprising anionic-modified cellulose nanofibers and an anti-coloring agent. Patent Document 1 describes that a dispersion that does not become colored upon heating can be provided. In addition, Patent Documents 2 and 3 disclose a paint comprising ultrafine cellulose fibers. In Patent Document 2, ultrafine cellulose fibers having a predetermined length and a predetermined width are used as additives for aqueous paints. Patent Document 3 discloses a paint comprising cellulose nanofibers and an aqueous emulsion resin, which is for use in the outer walls of buildings.

Patent Document 4 discloses a method for producing a complex comprising ultrafine cellulose fibers, in which the viscosity of a dispersion comprising 0.5% by mass of ultrafine cellulose fibers at 25° C. is set within a predetermined range in the case of a shear velocity of 1 $s^{-1}$ and in the case of a shear velocity of 100 $s^{-1}$. Patent Document 5 discloses a method for producing functional cellulose having a degree of polymerization of 250 or less from cellulosic materials. However, Patent Documents 4 and 5 do not disclose the amount of a change in the yellowness before and after ultraviolet irradiation.

Patent Document 6 discloses an ultrafine cellulose fiber-containing material comprising ultrafine cellulose fibers having phosphoric acid groups or phosphoric acid group-derived substituents. Patent Document 6 describes that this ultrafine cellulose fiber-containing material has excellent transparency and suppressed heat-yellowing. Patent Document 7 discloses a method for producing cellulose nanofibers, comprising preparing a dispersion comprising a hydrolyzed oxidized cellulosic raw material, and then defibrating the hydrolyzed oxidized cellulosic raw material, while dispersing it in a dispersion medium, so as to obtain nanofibers. This document describes that a transparent film that is hardly discolored by heat during drying is obtained. However, Patent Documents 6 and 7 do not disclose a cellulose fiber-containing material, in which the amount of a change in the yellowness before and after ultraviolet irradiation is suppressed. Besides, it cannot be said that the mechanism of heat-yellowing is identical to the mechanism of yellowing caused by ultraviolet irradiation, and suppression of heat-yellowing is a parameter that is different from suppression of yellowing caused by ultraviolet irradiation.

Patent Document 8 discloses that 0.1 to 200 ppm (relative to copper) EDTA-copper chelate compound is deposited on viscose cellulose fibers, so as to produce highly-weather-resistant and scentless viscose cellulose fibers.

PRIOR ART DOCUMENTS

Patent Documents

Patent Document 1: International Publication WO 2016/186055
Patent Document 2: JP-A-2009-067910
Patent Document 3: JP-A-2016-098488
Patent Document 4: JP-A-2015-221844
Patent Document 5: JP-A-2015-183095
Patent Document 6: JP-A-2017-66273
Patent Document 7: JP-A-2012-214717
Patent Document 8: JP-A-H7-138875 (1995)

SUMMARY OF INVENTION

Object to be Solved by the Invention

A composition containing ultrafine cellulose fibers is filled in a transparent wrapping material in some cases. However, when such an ultrafine cellulose fiber-containing composition is stored for a long period of time, in a state in which it is filled in a transparent wrapping material, it is concerned that the composition is deteriorated by the influence of a light, etc. Hence, in order to solve such problem of the prior art technique, the present inventors have conducted studies for the purpose of providing a composition capable of exhibiting excellent light resistance.

Means for Solving the Object

The present inventors have conducted intensive studies directed towards achieving the aforementioned object. As a result, the present inventors have found that, when a thickener comprising cellulose fibers having a fiber width of 8 nm or less and water is irradiated with ultraviolet rays, a composition capable of exhibiting excellent light resistance can be obtained by controlling the amount of a change in the yellowness of the thickener before and after the ultraviolet irradiation to be a predetermined value or less.

Specifically, the present invention has the following configurations.

[1] A thickener comprising cellulose fibers having a fiber width of 8 nm or less and water, wherein
the thickener is a slurry or a gel, and
when the thickener is filled in a colorless and transparent glass cell having an inside dimension of 1 cm in depth×4 cm in width×4.5 cm in height and the thickener is then irradiated with ultraviolet rays with a wavelength of 300 nm or more and 400 nm or less, using a xenon lamp, from the side of the maximum area surface of the glass cell, so as to be an irradiance of 180 W/m$^2$ and an integrated light amount of 500 mJ/m$^2$, the amount of a change in the yellowness before and after ultraviolet irradiation measured in accordance with JIS K 7373 is 10 or less.

[2] The thickener according to [1], wherein a diluted solution of the thickener having a solids concentration of 0.5% by mass has a shear viscosity of 3000 mPa·s or more at 25° C. and at a shear velocity of 1 s$^{-1}$.

[3] The thickener according to [1] or [2], wherein a diluted solution of the thickener having a solids concentration of 0.5% by mass has a shear viscosity of 250 mPa·s or more at 25° C. and at a shear velocity of 100 s$^{-1}$.

[4] The thickener according to any one of [1] to [3], wherein a polymerization degree of the cellulose fibers having a fiber width of 8 nm or less is 280 or more.

[5] The thickener according to any one of [1] to [4], wherein
when a film obtained in the following Procedure (a) is irradiated with ultraviolet rays with a wavelength of 300 nm or more and 400 nm or less, using a xenon lamp, from the side of one surface of the film, so as to be an irradiance of 180 W/m$^2$ and an integrated light amount of 500 mJ/m$^2$,
the amount of a change in the yellowness before and after ultraviolet irradiation measured, in accordance with JIS K 7373 is 5 or less:
(Procedure (a))
the thickener is diluted with ion exchange water to a concentration of 0.5% by mass, so as to produce a diluted solution A; polyethylene glycol having a weight average molecular weight of 4,000,000 is diluted with ion exchange water to a concentration of 0.5% by mass, so as to produce a diluted solution B; 100 parts by mass of the diluted solution A is mixed with 40 parts by mass of the diluted solution B to prepare a mixed solution; 113 g of the mixed solution is poured into a polystyrene-made petri dish having an inner diameter of 12 cm, and the petri dish is then left at rest in a constant-temperature bath at 50° C. for 24 hours, and thereafter, the formed film is peeled from the polystyrene-made petri dish.

[6] The thickener according to any one of [1] to [5], wherein the cellulose fibers comprise ionic substituents.

[7] The thickener according to any one of [1] to [6], wherein
when the thickener is processed into a slurry having a solids concentration of 0.4% by mass, which is then left at rest under the environment of 25° C. for 16 hours,
a measured pH of the slurry is pH 6 or more and pH 10 or less.

[8] The thickener according to any one of [1] to [7], wherein the total content of the cellulose fibers and the water is 90% by mass or more, with respect to the total mass of the thickener.

[9] The thickener according to any one of [1] to [8], wherein
when the thickener is processed into a slurry having a solids concentration of 0.2% by mass, which is then left at rest under the environment of 25° C. for 16 hours,
a haze of the slurry, which is measured in accordance with JIS K 7136, is 20% or less.

[10] The thickener according to any one of [1] to [9], wherein
when the thickener is processed into a slurry having a solids concentration of 0.4% by mass, which is then left at rest under the environment of 25° C. for 16 hours,
a viscosity of the slurry, which is measured by rotating at 25° C. at a rotation number of 3 rpm for 3 minutes, using a type B viscometer, is 3000 mPa·s or more.

[11] A composition comprising the thickener according to any one of [1] to [10].

[12] The composition according to [11], further comprising a resin component.

[13] A sheet comprising the thickener according to any one of [1] to [10].

Advantageous Effects of Invention

According to the present invention, a composition capable of exhibiting excellent light resistance can be obtained.

BRIEF DESCRIPTION OF DRAWINGS

FIG. 1 is a graph showing the relationship between the amount of NaOH added dropwise to a fiber raw material having a phosphoric acid group and the electrical conductivity.

FIG. 2 is a graph showing the relationship between the amount of NaOH added dropwise to a fiber raw material having a carboxyl group and the electrical conductivity.

EMBODIMENTS OF CARRYING OUT THE INVENTION

Hereinafter, the present invention will be described in detail. The description for components described below will be based on representative embodiments or specific examples; however, the present invention will not be limited to such embodiments.
(Thickener)
The present invention relates to a thickener comprising cellulose fibers having a fiber width of 8 nm or less and water, wherein the thickener is a slurry-state or gelatinous thickener. When the thickener is filled in a colorless and transparent glass cell having an inside dimension of 1 cm in depth×4 cm in width×4.5 cm in height and the thickener is then irradiated with ultraviolet rays with a wavelength of 300 nm or more and 400 nm or less, using a xenon lamp, from the side of the maximum area surface of the glass cell, so as to be an irradiance of 180 W/m$^2$ and an integrated light amount of 500 mJ/m$^2$, the amount of a change in the yellowness before and after ultraviolet irradiation measured in accordance with JIS K 7373 is 10 or less. It is to be noted that the ultrafine cellulose fibers in the present description include cellulose fibers having a fiber width of 8 nm or less.

Since the thickener of the present invention has the above-described configuration, a composition comprising the thickener can exhibit excellent light resistance. The light resistance of a composition can be evaluated by wrapping the composition with a transparent wrapping material, then preserving it for a long period of time, such as 180 days or more, and then observing the deteriorated state of the composition, etc. For example, upon evaluation of light resistance, a composition is wrapped with a transparent wrapping material and is preserved for a long period of time, and thereafter, the colored condition thereof is then observed. When coloration is suppressed, the composition can be evaluated to have good light resistance.

In the present invention, it has been discovered for the first time that the properties of a thickener comprising ultrafine cellulose fibers, among individual components comprised in the composition, largely influence on the light resistance of the composition. The present inventors have studied regarding the improvement of the light resistance of the composition comprising ultrafine cellulose fibers. As a result, the inventors have reached the use of a thickener having the above-described configuration, and have realized a composition having excellent light resistance.

Moreover, in the present invention, a sheet obtained using such a thickener can also exhibit excellent light resistance.

The light resistance of the sheet obtained using the thickener can be evaluated by applying a coating liquid comprising the thickener onto a substrate, then drying the substrate in a dryer at 100° C. for 1 hour to form a coating film (sheet), then preserving the sheet for a long period of time, such as 180 days or more, and then observing a deteriorated state, etc. For example, the colored condition of the sheet after long-term preservation is observed, and when coloration is suppressed, it can be evaluated that the sheet has good light resistance. It is to be noted that, in the present description, the term "sheet" includes a membrane, a coating film, and a film.

In the present description, the term "slurry" means a liquid in which a solid is dispersed. Specifically, a liquid having a viscosity of less than $10^5$ mPa·s is referred to as a "slurry," whereas a solid having a viscosity of $10^5$ mPa·s or more and less than $10^9$ mPa·s is referred to as a "gel." It is to be noted that a solid having no fluidity (with a viscosity of $10^9$ mPa·s or more) is referred to as a "solid."

The thickener is filled in a colorless and transparent glass cell having an inside dimension of 1 cm in depth×4 cm in width×4.5 cm in height, and using a xenon lamp, the glass cell is irradiated with ultraviolet rays with a wavelength of 300 nm or more and 400 nm or less from the side of the maximum area of the glass cell, thereby resulting in an irradiance of 180 W/m² and an integrated light amount of 500 mJ/m². In this case, the amount of a change in the yellowness before and after ultraviolet irradiation measured in accordance with JIS K 7373 is 10 or less. It is to be noted that the maximum area of the glass cell is the surface of the glass cell surrounded by a height side of 4.5 cm and a width side of 4 cm. The amount of a change in the yellowness before and after ultraviolet irradiation is preferably 9 or less, more preferably 8 or less, further preferably 6 or less, and particularly preferably 4 or less.

Upon irradiation with ultraviolet rays under the above-described conditions, for example, a weathermeter (manufactured by Suga Test Instruments Co., Ltd., Super Xenon Weather Meter SX75) can be used. Besides, upon the measurement of the yellowness of the thickener before and after the ultraviolet irradiation, the measurement is carried out in a state in which the thickener is filled in the above-described glass cell. As a measuring apparatus, for example, Colour Cute i (manufactured by Suga Test Instruments Co., Ltd.) can be used. The amount of a change in the yellowness before and after ultraviolet irradiation is calculated according to the following equation:

Amount of change in yellowness of thickener before and after ultraviolet irradiation=(yellowness of thickener after ultraviolet irradiation)−(yellowness of thickener before ultraviolet irradiation).

A film is produced according to the following Procedure (a), using the thickener of the present invention, and then, using a xenon lamp, the film is then irradiated with ultraviolet rays with a wavelength of 300 nm or more and 400 nm or less from one side of the film, thereby resulting in an irradiance of 180 W/m² and an integrated light amount of 500 mJ/m². In this case, the amount of a change in the yellowness before and after ultraviolet irradiation measured in accordance with JIS K 7373 is 5 or less. The amount of a change in the yellowness before and after ultraviolet irradiation is preferably 4 or less, more preferably 3 or less, further preferably 2 or less, and particularly preferably 1 or less.

(Procedure (a))

The thickener is diluted with ion exchange water to a concentration of 0.5% by mass, so as to prepare a diluted solution A. Polyethylene glycol with a weight average molecular weight of 4,000,000 is diluted with ion exchange water to a concentration of 0.5% by mass, so as to prepare a diluted solution B. Thereafter, 100 parts by mass of the diluted solution A and 40 parts by mass of the diluted solution B are mixed with each other to obtain a mixed solution. Subsequently, 113 g of the mixed solution is poured into a polystyrene-made petri dish with an inner diameter of 12 cm, and is then left at rest in a constant-temperature bath at 50° C. for 24 hours. Thereafter, the formed film is peeled from the polystyrene-made petri dish.

By the above-described Procedure (a), a film having a basis weight of 50 g/m² is obtained. When such a film is irradiated with ultraviolet rays under the above-described conditions a weathermeter (manufactured by Suga Test Instruments Co., Ltd., Super Xenon Weather Meter SX75), for example, can be used. In addition, as an apparatus used upon the measurement of the yellowness of the film before and after ultraviolet irradiation, Colour Cute i (manufactured by Suga Test Instruments Co., Ltd.), for example, can be used. The amount of a change in the yellowness of the film is calculated according to the following equation:

Amount of change in yellowness of film before and after ultraviolet irradiation=(yellowness of film after ultraviolet irradiation)−(yellowness of film before ultraviolet irradiation).

The content of cellulose fibers having a fiber width of 8 nm or less in the thickener is preferably 0.01% by mass or more, more preferably 0.10% by mass or more, and further preferably 1% by mass or more, with respect to the total mass of the thickener. On the other hand, the content of the cellulose fibers having a fiber width of 8 nm or less in the thickener is preferably 50% by mass or less, more preferably 30% by mass or less, further preferably 10% by mass or less, and particularly preferably 5% by mass or less, with respect to the total mass of the thickener.

Moreover, the content of water in the thickener is preferably 50% by mass or more, more preferably 70% by mass or more, further preferably 90% by mass or more, and particularly preferably 95% by mass or more, with respect to the total mass of the thickener. On the other hand, the content of the water in the thickener is preferably 99.99% by mass or less, and more preferably 99.90% by mass or less, with respect to the total mass of the thickener.

Furthermore, the content of the cellulose fibers having a fiber width of 8 nm or less and the water in the thickener is preferably 90% by mass or more, more preferably 95% by mass or more, further preferably 98% by mass or more, and particularly preferably 99% by mass or more, with respect to the total mass of the thickener. Further, the content of the cellulose fibers having a fiber width of 8 nm or less and the water may also be 100% by mass with respect to the total mass of the thickener. Thus, the majority of the thickener of the present invention is formed with the cellulose fibers having a fiber width of 8 nm or less and the water. It is preferable that the thickener does not comprise other components, or that, even if the thickener comprises other components, they are in a small amount.

The thickener is processed into a slurry having a solids concentration of 0.4% by mass, and is then left at rest under the environment of 25° C. for 16 hours or more. The pH of the slurry measured after such operations is preferably pH 6 or more, more preferably pH 6.5 or more, and further preferably pH 7.0 or more. The pH of the slurry can also be set at pH 7.5 or more. On the other hand, the pH of the slurry is preferably pH 10 or less, and more preferably pH 9.5 or less.

The thickener is processed into a slurry having a solids concentration of 0.2% by mass, and is then left at rest under the environment of 25° C. for 16 hours or more. The haze of the slurry measured after such operations in accordance with JIS K 7136 is preferably 20% or less, more preferably 15% or less, further preferably 10% or less, still further preferably 5% or less, and particularly preferably 2.4% or less. Further, the haze of the slurry can also be set at 2.0% or less. As a haze meter used in the measurement of the haze of the slurry, a haze meter (manufactured by MURAKAMI COLOR RESEARCH LABORATORY Co., Ltd., HM-150), for example, can be used. Upon the measurement of the haze, the slurry having a solids concentration of 0.2% by mass, which has been left at rest under the environment of 25° C. for 16 hours or more, is placed in a glass cell for liquid having an optical path length of 1 cm, and the haze thereof is then measured. It is to be noted that the measurement of zero point was carried out with ion exchange water filled in the same glass cell as that described above.

The thickener is processed into a slurry having a solids concentration of 0.4% by mass, and is then left at rest under the environment of 25° C. for 16 hours or more. The viscosity of the slurry, which is measured after such operations by being rotated using a type B viscometer at 25° C. at a rotation number of 3 rpm for 3 minutes, is preferably 3000 mPa·s or more, more preferably 5000 mPa·s or more, further preferably 9000 mPa·s or more, and particularly preferably 20000 mPa·s or more. The upper limit value of the viscosity of the slurry is not particularly limited, but it can be, for example, 100000 mPa·s. Upon the measurement of the viscosity, a slurry having a solids concentration of 0.4% by mass, which has been left at rest under the environment of 25° C. for 16 hours or more, is measured using a type B viscometer. As such a type B viscometer, Type B Viscometer (No. 3 Rotor) (manufactured by BROOKFIELD, analog viscometer T-LVT), for example, can be used.

With regard to the thickener of the present invention, the shear viscosity of a diluted solution having a solids concentration of 0.5% by mass at 25° C. and at a shear velocity of 1 s$^{-1}$ is preferably more than 2000 mPa·s, more preferably 3000 mPa·s or more, even more preferably 4000 mPa·s or more, further preferably 5000 mPa·s or more, still further preferably 7000 mPa·s or more, particularly preferably 9000 mPa·s or more, and most preferably 10000 mPa·s or more. The upper limit of the shear viscosity at the above-described shear velocity of 1 s$^{-1}$ is not particularly limited, but it is generally 30000 mPa·s or less, and preferably 20000 mPa·s or less.

With regard to the thickener of the present invention, the shear viscosity of a diluted solution having a solids concentration of 0.5% by mass at 25° C. and at a shear velocity of 100 s$^{-1}$ is preferably more than 200 mPa·s, more preferably 250 mPa·s or more, even more preferably 300 mPa·s or more, further preferably 350 mPa·s or more, still further preferably 400 mPa·s or more, particularly preferably 450 mPa·s or more, and most preferably 500 mPa·s or more. The upper limit of the shear viscosity at the above-described shear velocity of 100 s$^{-1}$ is not particularly limited, but it is generally 2000 mPa·s or less, and preferably 1000 mPa·s or less.

The shear viscosity is measured according to the following method. Ion exchange water is poured onto the thickener to prepare a diluted solution having a solids concentration of 0.5% by mass. The temperature in the measurement environment is set at 25° C., and the diluted solution is placed on a measurement board of a rheometer (manufactured by Haake, Rheo Stress 1). The shear viscosity is continuously measured at a shear velocity from 0.01 s$^{-1}$ to 100 s$^{-1}$. The values of the shear viscosity at 1 s$^{-1}$ and 100 s$^{-1}$ are obtained.

The polymerization degree of the cellulose fibers having a fiber width of 8 nm or less in the thickener of the present invention is preferably more than 250, more preferably 280 or more, further preferably 300 or more, still further preferably 350 or more, particularly preferably 400 or more, and most preferably 500 or more. The upper limit of the polymerization degree of the cellulose fibers having a fiber width of 8 nm or less is not particularly limited, but it is generally 2000 or less, and preferably 1000 or less.

The polymerization degree of the cellulose fibers is measured in accordance with Tappi T230. Specifically, the cellulose fibers as a measurement target are dispersed in a dispersion medium, the viscosity thereof is then measured (defined as η1), and the blank viscosity is then measured using only the dispersion medium (defined as η0). Thereafter, a specific viscosity (ηsp) and an intrinsic viscosity ([η]) are measured according to the following equations.

$$\eta sp = (\eta 1/\eta 0) - 1$$

$$[\eta] = \eta sp/(c(1+0.28 \times \eta sp))$$

In the above equation, c indicates the concentration of ultrafine cellulose fibers upon the measurement of the viscosity.

Further, the polymerization degree (DP) of the ultrafine cellulose fibers is calculated according to the following equation.

$$DP = 1.75 \times [\eta]$$

As mentioned above, the thickener of the present invention can realize high viscosity and high polymerization degree, as well as excellent light resistance.

<Ultrafine Cellulose Fibers>

The thickener of the present invention comprises ultrafine cellulose fibers, and further, comprises, as such ultrafine cellulose fibers, cellulose fibers having a fiber width of 8 nm or less.

With regard to the ultrafine cellulose fibers used in the present invention, the content rate of glucose units is defined as $C_{glu}$ (% by mass), the content rate of xylose units is defined as $C_{xyl}$ (% by mass), the content rate of mannose units is defined as $C_{man}$ (% by mass), the content rate of galactose units is defined as $C_{gal}$ (% by mass), and the content rate of arabinose units is defined as $C_{ara}$ (% by mass). In this case, the value of $(C_{xyl}+C_{man}+C_{gal}+C_{ara})/C_{glu}$ is preferably more than 0.1, and more preferably 0.12 or more. Besides, the value of $(C_{xyl}+C_{man}+C_{gal}+C_{ara})/C_{glu}$ of the phosphoric acid group-introduced cellulose fibers produced in Examples 1 to 6 of the present description is 0.12 or more.

The content rate of glucose units $C_{glu}$, the content rate of xylose units $C_{xyl}$, the content rate of mannose units $C_{man}$, the content rate of galactose units $C_{gal}$, and the content rate of arabinose units $C_{ara}$ can be measured by ion chromatography, after the ultrafine cellulose fibers have been hydrolyzed to monosaccharides. Specifically, 200 mg (absolute dry mass) of ultrafine cellulose fibers are collected, and 7.5 ml of 72% sulfuric acid is then added to the ultrafine cellulose fibers. Thereafter, the resulting ultrafine cellulose fibers are placed in a shaking constant-temperature bath, and are then shaken and stirred at 30° C., at 160 rpm for 60 minutes, so as to carry out a first hydrolysis. Subsequently, after completion of the first hydrolysis, 30 µl of a pulp dispersion is placed in a 1.5-ml tube containing 840 μl of ultrapure water, followed by stirring, so that the pulp dispersion is diluted to a sulfuric acid concentration of 4%. Thereafter, the resultant is treated in an autoclave at 121° C. for 1 hour, so as to carry out a second hydrolysis. Thereafter, using ion chromatography (manufactured by Dionex, ICS-5000) equipped with a column (manufactured by Dionex, CarboPac PA1), the content rate of glucose units $C_{glu}$, the content rate of xylose units $C_{xyl}$, the content rate of mannose units $C_{man}$, the content rate of galactose units $C_{gal}$, and the content rate of arabinose units $C_{ara}$ are quantified. In the present invention, the total of the glucose units, xylose units, mannose units, galactose units and arabinose units is set to be 100% by mass, and the content rate of each unit is calculated.

In the analysis with the ion chromatography, the flow rate is set at 1 ml/min, and the column temperature is set at room temperature. Water is used as a mobile phase, and as washing solutions, a 0.3 N sodium hydroxide aqueous solution, a 0.1 N potassium hydroxide aqueous solution, and a 0.25 N sodium carbonate aqueous solution are used. In the analysis, arabinose, galactose, glucose, xylose, and mannose are separated and eluted in this order. The detected peak is analyzed using the analytical software (PeakNet) manufactured by Dionex.

It is to be noted that, regarding the content rate of each monosaccharide unit, the value measured by hydrolyzing the ultrafine cellulose fibers obtained after defibration is equivalent to the value measured by hydrolyzing a pulp raw material immediately before the defibration.

The raw material of cellulose fibers for obtaining ultrafine cellulose fibers is not particularly limited, but pulp is preferably used from the viewpoint of availability and inexpensiveness. Examples of the pulp include wood pulp, non-wood pulp, and deinked pulp. Examples of the wood pulp include chemical pulps such as leaf bleached kraft pulp (LBKP), needle bleached kraft pulp (NBKP), sulfite pulp (SP), dissolving pulp (DP), soda pulp (AP), unbleached kraft pulp (UKP), and oxygen bleached kraft pulp (OKP). Further, included are, but not particularly limited to, semichemical pulps such as semi-chemical pulp (SCP) and chemi-ground wood pulp (CGP); and mechanical pulps such as ground pulp (GP) and thermomechanical pulp (TMP, BCTMP). Examples of the non-wood pulp include, but are not particularly limited to, cotton pulps such as cotton linter and cotton lint; non-wood type pulps such as hemp, wheat straw, and bagasse; and cellulose isolated from ascidian, seaweed, etc., chitin, and chitosan. As a deinked pulp, there is deinked pulp using waste paper as a raw material, but it is not particularly limited thereto. The pulp of the present embodiment may be used singly, or in combination of two or more types. Among the above-listed pulp types, wood pulp and deinked pulp including cellulose are preferable from the viewpoint of easy availability. Among wood pulps, chemical pulp is preferable because it has a higher cellulose content to enhance the yield of the ultrafine cellulose fibers and decomposition of cellulose in the pulp is mild at the time of ultrafine fiber formation (defibration) to yield ultrafine cellulose fibers having a long fiber length with a high aspect ratio. Among them, kraft pulp and sulfite pulp are most preferably selected.

The average fiber width of the ultrafine cellulose fibers is 1000 nm or less according to observation with an electron microscope. The average fiber width is preferably 2 nm or more and 1000 nm or less, more preferably 2 nm or more and 100 nm or less, even more preferably 2 nm or more and 50 nm or less, and further preferably 2 nm or more and 10 nm or less, but is not particularly limited thereto. When the average fiber width of the ultrafine cellulose fibers is less than 2 nm, since they are dissolved in water as cellulose molecules, there appears tendency that the physical properties (strength, rigidity, and dimensional stability) as an ultrafine cellulose fiber are not expressed sufficiently. The ultrafine cellulose fiber comprised in the thickener of the present invention is, for example, monofilament cellulose having a fiber width of 8 nm or less.

The measurement of a fiber width of an ultrafine cellulose fiber by electron microscopic observation is carried out as follows. An aqueous suspension of the ultrafine cellulose fibers having a concentration of 0.05% by mass or more and 0.1% by mass or less is prepared, and the suspension is casted onto a hydrophilized carbon film-coated grid as a sample for TEM observation. If the sample contains wide fibers, SEM images of the surface of the suspension casted onto glass may be observed. The sample is observed using electron microscope images taken at a magnification of 1000×, 5000×, 10000×, or 50000× according to the widths of the constituent fibers. However, the sample, the observation conditions, and the magnification are adjusted so as to satisfy the following conditions:

(1) A single straight line X is drawn in any given portion in an observation image, and 20 or more fibers intersect with the straight line X.

(2) A straight line Y, which intersects perpendicularly with the aforementioned straight line in the same image as described above, is drawn, and 20 or more fibers intersect with the straight line Y.

The widths of the fibers intersecting the straight line X and the straight line Y in the observation image meeting the above-described conditions are visually read. 3 or more sets of images of surface portions, which are at least not overlapped, are thus observed, and the widths of the fibers intersecting the straight line X and the straight line Y are read in the each image. At least 120 fiber widths (20 fibers×2×3=120) are thus read. The average fiber width (which is simply referred to as a "fiber width" at times) of the ultrafine cellulose fibers is an average value of the fiber widths thus read.

The fiber length of the ultrafine cellulose fibers is not particularly limited, and it is preferably 0.1 μm or more and 1000 μm or less, more preferably 0.1 μm or more and 800 μm or less, and particularly preferably 0.1 μm or more and 600 μm or less. By setting the fiber length within the above-described range, destruction of the crystalline region of the ultrafine cellulose fibers can be suppressed, and the slurry viscosity of the ultrafine cellulose fibers can also be set within an appropriate range. It is to be noted that the fiber length of the ultrafine cellulose fibers can be obtained by an image analysis using TEM, SEM or AFM.

The ultrafine cellulose fibers preferably have a type I crystal structure. In this regard, the fact that the ultrafine cellulose fibers have a type I crystal structure may be identified by a diffraction profile obtained from a wide angle X-ray diffraction photograph using CuKα ($\lambda$=1.5418 Å) monochromatized with graphite. Specifically, it may be identified based on the fact that there are typical peaks at two positions near 2θ=14° or more and 17° or less, and near 2θ=22° or more and 23° or less.

The percentage of the type I crystal structure occupied in the ultrafine cellulose fibers is preferably 30% or more, more preferably 50% or more, and further preferably 70% or more. In this case, more excellent performance can be expected, in terms of heat resistance and the expression of low linear thermal expansion. The crystallinity can be obtained by measuring an X-ray diffraction profile and obtaining it according to a common method (Seagal et al., Textile Research Journal, Vol. 29, p. 786, 1959).

The ultrafine cellulose fibers preferably have an ionic functional group. The ionic functional group is preferably an anionic group. Such an ionic functional group is preferably at least one selected from, for example, a phosphoric acid group or a phosphoric acid group-derived substituent (which is simply referred to as a "phosphoric acid group" at times), a carboxyl group or a carboxyl group-derived substituent (which is simply referred to as a "carboxyl group" at times), or a sulfone group or a sulfone group-derived substituent (which is simply referred to as a "sulfone group" at times); is more preferably at least one selected from a phosphoric acid group or a carboxyl group; and is particularly preferably a phosphoric acid group.

The phosphoric acid group is a divalent functional group corresponding to phosphoric acid from which hydroxyl groups are removed. Specifically, it is a group represented by —$PO_3H_2$. The phosphoric acid group-derived substituents include substituents, such as condensation-polymerized phosphoric acid groups, salts of phosphoric acid groups, and phosphoric acid ester groups, and they may be either ionic substituents or nonionic substituents.

In the present invention, the phosphoric acid group or the phosphoric acid group-derived substituent may be a substituent represented by the following formula (1):

[Formula 1]

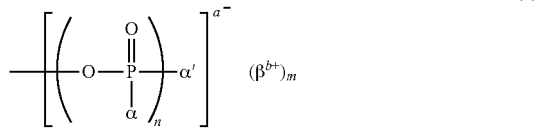

(1)

wherein a, b, m, and n each independently represent an integer of 1 or greater (provided that a=b×m). In addition, α and α' each independently represent R or OR. R represents a hydrogen atom, a saturated straight chain hydrocarbon group, a saturated branched chain hydrocarbon group, a saturated cyclic hydrocarbon group, an unsaturated straight chain hydrocarbon group, an unsaturated branched chain hydrocarbon group, an aromatic group, or a derivative thereof. β represents a mono- or more-valent cation consisting of an organic or inorganic matter.

<Phosphoric Acid Group Introduction Step>

The phosphoric acid group introduction step may be performed by allowing at least one selected from a compound having phosphoric acid groups or salts thereof (hereinafter, referred to as a "phosphorylating reagent" or "Compound A") to react with the fiber raw material including cellulose. Such a phosphorylating reagent may be mixed into the fiber raw material in a dry or wet state, in the form of a powder or an aqueous solution. In another example, a powder or an aqueous solution of the phosphorylating reagent may be added into a slurry of the fiber raw material.

The phosphoric acid group introduction step may be performed by allowing at least one selected from a compound having phosphoric acid groups or salts thereof (a phosphorylating reagent or Compound A) to react with the fiber raw material including cellulose. It is to be noted that this reaction may be performed in the presence of at least one selected from urea or derivatives thereof (hereinafter, referred to as "Compound B").

One example of the method of allowing Compound A to act on the fiber raw material in the presence of Compound B includes a method of mixing the fiber raw material in a dry or wet state with a powder or an aqueous solution of Compound A and Compound B. Another example thereof includes a method of adding a powder or an aqueous solution of Compound A and Compound B to a slurry of the fiber raw material. Among them, a method of adding an aqueous solution of Compound A and Compound B to the fiber raw material in a dry state, or a method of adding a powder or an aqueous solution of Compound A and Compound B to the fiber raw material in a wet state is preferable because of the high homogeneity of the reaction. Compound A and Compound B may be added at the same time or may be added separately. Alternatively, Compound A and Compound B to be subjected to the reaction may be first added as an aqueous solution, which may be then compressed to squeeze out redundant chemicals. The form of the fiber raw material is preferably a cotton-like or thin sheet form, but the form is not particularly limited thereto.

The Compound A used in the present embodiment is at least one selected from a compound having a phosphoric acid group or a salt thereof.

Examples of the compound having a phosphoric acid group include, but are not particularly limited to, phosphoric acid, lithium salts of phosphoric acid, sodium salts of phosphoric acid, potassium salts of phosphoric acid, and ammonium salts of phosphoric acid. Examples of the lithium salts of phosphoric acid include lithium dihydrogen phosphate, dilithium hydrogen phosphate, trilithium phosphate, lithium pyrophosphate, and lithium polyphosphate. Examples of the sodium salts of phosphoric acid include sodium dihydrogen phosphate, disodium hydrogen phosphate, trisodium phosphate, sodium pyrophosphate, and sodium polyphosphate. Examples of the potassium salts of phosphoric acid include potassium dihydrogen phosphate, dipotassium hydrogen phosphate, tripotassium phosphate, potassium pyrophosphate, and potassium polyphosphate. Examples of the ammonium salts of phosphoric acid include ammonium dihydrogen phosphate, diammonium hydrogen phosphate, triammonium phosphate, ammonium pyrophosphate, and ammonium polyphosphate.

Among them, from the viewpoints of high efficiency in introduction of the phosphoric acid group, an improving tendency of the defibration efficiency in a defibration step described below, low cost, and industrial applicability, phosphoric acid, sodium phosphate, potassium phosphate, and ammonium phosphate are preferable. Sodium dihydrogen phosphate, or disodium hydrogen phosphate is more preferable.

Further, since the uniformity of the reaction is improved and the efficiency in introduction of a phosphoric acid group is enhanced, the Compound A is preferably used as an aqueous solution. Although there is no particular restriction on the pH of an aqueous solution of the Compound A, the pH is preferably pH 7 or less because the efficiency in introduction of a phosphoric acid group is high, and more preferably pH 3 or more and pH 7 or less from the viewpoint of suppression of hydrolysis of a pulp fiber. The pH of an aqueous solution of the Compound A may be adjusted, for example, by using, among compounds having a phosphoric acid group, a combination of an acidic one and an alkaline one, and changing the amount ratio thereof. The pH of an aqueous solution of Compound A may also be adjusted by adding an inorganic alkali or an organic alkali to an acidic compound among compounds having a phosphoric acid group.

Although the amount of the Compound A added to a fiber raw material is not particularly limited, if the amount of the Compound A added is converted to a phosphorus atomic weight, the amount of phosphorus atoms added with respect to the fiber raw material (absolute dry mass) is preferably 0.5% by mass or more and 100% by mass or less, more preferably 1% by mass or more and 50% by mass or less, and most preferably 2% by mass or more and 30% by mass or less. When the amount of phosphorus atoms added to the fiber raw material is within the above-described range, the yield of the ultrafine cellulose fibers can be further improved. If the amount of phosphorus atoms added to the fiber raw material exceeds 100% by mass, the effect of improving the yield has reached the ceiling and the cost of the used Compound A increases. On the other hand, by setting the amount of phosphorus atoms added to the fiber raw material to be the above-described lower limit or more, the yield can be enhanced.

Examples of the Compound B used in the present embodiment include urea, biuret, 1-phenyl urea, 1-benzyl urea, 1-methyl urea, and 1-ethyl urea.

The Compound B is preferably used as an aqueous solution, as with the Compound A. Further, an aqueous solution in which both the Compound A and Compound B are dissolved is preferably used, because the uniformity of a reaction may be enhanced. The amount of the Compound B added to a fiber raw material (absolute dry mass) is preferably 1% by mass or more and 500% by mass or less, more preferably 10% by mass or more and 400% by mass or less, further preferably 100% by mass or more and 350% by mass or less, and particularly preferably 150% by mass or more and 300% by mass or less.

The reaction system may comprise an amide or an amine, in addition to the Compound A and the Compound B. Examples of the amide include formamide, dimethylformamide, acetamide, and dimethylacetamide. Examples of the amine include methylamine, ethylamine, trimethylamine, triethylamine, monoethanolamine, diethanolamine, triethanolamine, pyridine, ethylenediamine, and hexamethylenediamine. Among them, particularly, triethylamine is known to work as a favorable reaction catalyst.

In the phosphoric acid group introduction step, it is preferable to perform a heat treatment. For the temperature of such a heat treatment, it is preferable to select a temperature that allows an efficient introduction of phosphoric acid groups, while suppressing the thermal decomposition or hydrolysis reaction of fibers. Specifically, the temperature is preferably 50° C. or higher and 300° C. or lower, more preferably 100° C. or higher and 250° C. or lower, and further preferably 150° C. or higher and 200° C. or lower. In addition, a vacuum dryer, an infrared heating device, or a microwave heating device may be used for heating.

Upon the heat treatment, if the time for leaving the fiber raw material to stand still gets longer while the fiber raw material slurry to which the Compound A is added contains water, as drying advances, water molecules and the Compound A dissolved therein move to the surface of the fiber raw material. As such, there is a possibility of the occurrence of unevenness in the concentration of the Compound A in the fiber raw material, and the introduction of phosphoric acid groups to the fiber surface may not progress uniformly. In order to suppress the occurrence of unevenness in the concentration of the Compound A in the fiber raw material due to drying, the fiber raw material in the shape of a very thin sheet may be used, or a method of heat-drying or vacuum-drying the fiber raw material, while kneading or stirring with the Compound A using a kneader or the like, may be employed.

As a heating device used for heat treatment, a device capable of always discharging moisture retained by slurry or moisture generated by an addition reaction of phosphoric acid groups with hydroxy groups of the fiber to the outside of the device system is preferable, and for example, forced convection ovens or the like are preferable. By always discharging moisture in the device system, in addition to being able to suppress a hydrolysis reaction of phosphoric acid ester bonds, which is a reverse reaction of the phosphoric acid esterification, acid hydrolysis of sugar chains in the fiber may be suppressed as well, and ultrafine fibers with a high axial ratio can be obtained.

The time for heat treatment is, although affected by the heating temperature, preferably 1 second or more and 300 minutes or less, more preferably 1 second or more and 1000 seconds or less, and further preferably 10 seconds or more and 800 seconds or less, after moisture is substantially removed from the fiber raw material slurry. In the present invention, by setting the heating temperature and heating time within an appropriate range, the amount of phosphoric acid groups introduced can be set within a preferred range.

The content of phosphoric acid groups (the amount of phosphoric acid groups introduced) is, per 1 g (mass) of the ultrafine cellulose fibers, preferably 0.10 mmol/g or more, more preferably 0.20 mmol/g or more, and further preferably 0.50 mmol/g or more. On the other hand, the content of phosphoric acid groups is, per 1 g (mass) of the ultrafine cellulose fibers, preferably 3.65 mmol/g or less, more preferably 3.00 mmol/g or less, further preferably 2.00 mmol/g or less, and particularly preferably less than 1.50 mmol/g. By setting the content of phosphoric acid groups within the above-described range, it may become easy to perform fibrillation on the fiber raw material, and the stability of the ultrafine cellulose fibers can be enhanced. In addition, by setting the amount of phosphoric acid groups introduced within the above-described range, a change in the yellowness of the thickener can be more effectively suppressed. Besides, in the present description, the content of phosphoric acid groups in the ultrafine cellulose fibers (the amount of phosphoric acid introduced) is equal to the amount of strongly acidic groups of phosphoric acid groups in the ultrafine cellulose fibers, as described later.

The amount of phosphoric acid groups introduced into a fiber raw material may be measured by a conductometric titration method. Specifically, the amount introduced may be measured by performing fibrillation on ultrafine fibers in a defibration treatment step, treating the resulting slurry comprising ultrafine cellulose fibers with an ion exchange resin, and then examining a change in the electrical conductivity while adding an aqueous sodium hydroxide solution.

The conductometric titration confers a curve shown in FIG. 1 as an alkali is added. First, the electrical conductivity is rapidly reduced (hereinafter, this region is referred to as a "first region"). Then, the conductivity starts rising slightly (hereinafter, this region is referred to as a "second region"). Then, the increment of the conductivity is increased (hereinafter, this region is referred to as a "third region"). In short, three regions appear. The boundary point between the second region and the third region is defined as a point at which a change amount in the two differential values of conductivity, namely, an increase in the conductivity (inclination) becomes maximum. Among them, the amount of the alkali required for the first region among these regions is equal to the amount of a strongly acidic group in the slurry used in the titration, and the amount of the alkali required for the second region is equal to the amount of a weakly acidic group in the slurry used in the titration. When condensation of a phosphoric acid group occurs, the weakly acidic group is apparently lost, so that the amount of the alkali required for the second region is decreased as compared with the amount of the alkali required for the first region. On the other hand, the amount of the strongly acidic group agrees with the amount of the phosphorus atom regardless of the presence or absence of condensation. Therefore, the simple term "the amount of the phosphoric acid group introduced (or the amount of the phosphoric acid group)" or "the amount of the substituent introduced (or the amount of the substituent)" refers to the amount of the strongly acidic group. That is to say, the amount (mmol) of the alkali required for the first region in the curve shown in FIG. 1 is divided by the solid content (g) in the slurry as a titration target to obtain the amount (mmol/g) of the substituent introduced.

The phosphoric acid group introduction step may be performed at least once, but may be repeated multiple times as well. This case is preferable, since more phosphoric acid groups are introduced.

<Carboxyl Group Introduction Step>

In the present invention, when the ultrafine cellulose fibers have carboxyl groups, such carboxyl groups can be introduced into the ultrafine cellulose fibers, for example, by performing an oxidation treatment such as a TEMPO oxidation treatment on the fiber raw material, or by treating the ultrafine cellulose fibers with a compound having groups derived from carboxylic acid, a derivative thereof, or an acid anhydride thereof or a derivative thereof.

Examples of the compound having a carboxyl group include, but are not particularly limited to, dicarboxylic acid compounds such as maleic acid, succinic acid, phthalic acid, fumaric acid, glutaric acid, adipic acid or itaconic acid, and tricarboxylic acid compounds such as citric acid or aconitic acid.

Examples of the acid anhydride of the compound having a carboxyl group include, but are not particularly limited to, acid anhydrides of dicarboxylic acid compounds, such as maleic anhydride, succinic anhydride, phthalic anhydride, glutaric anhydride, adipic anhydride, or itaconic anhydride.

Examples of the derivative of the compound having a carboxyl group include, but are not particularly limited to, an imidized product of the acid anhydride of the compound having a carboxyl group and a derivative of the acid anhydride of the compound having a carboxyl group. Examples of the imidized product of the acid anhydride of the compound having a carboxyl group include, but are not particularly limited to, imidized products of dicarboxylic acid compounds, such as maleimide, succinimide, or phthalimide.

The derivative of the acid anhydride of the compound having a carboxyl group is not particularly limited. Examples include acid anhydrides of the compounds having a carboxyl group, in which at least some hydrogen atoms are substituted with substituents (for example, an alkyl group, a phenyl group, etc.), such as dimethylmaleic anhydride, diethylmaleic anhydride, or diphenylmaleic anhydride.

The amount of carboxyl groups introduced is, per 1 g (mass) of the ultrafine cellulose fibers, preferably 0.10 mmol/g or more, more preferably 0.20 mmol/g or more, and further preferably 0.50 mmol/g or more. On the other hand, the content of carboxyl groups is, per 1 g (mass) of the ultrafine cellulose fibers, preferably 3.65 mmol/g or less, more preferably 3.50 mmol/g or less, and further preferably 3.00 mmol/g or less.

The amount of carboxyl groups introduced into a fiber raw material can be measured by a conductometric titration method. In conductometric titration, addition of alkali gives the curve shown in FIG. 2. The amount of the alkali (mmol) required for the first region in the curve shown in FIG. 2 is divided by the solid content (g) in the slurry to be titrated to determine the amount of the substituents introduced (mmol/g).

<Alkali Treatment>

When the ultrafine cellulose fibers are produced, an alkali treatment may be conducted between an ionic substituent introduction step, such as a phosphoric acid group introduction step or a carboxyl group introduction step, and a defibration treatment step described below. The method of the alkali treatment is not particularly limited. For example, a method of immersing ionic substituent-introduced fibers in an alkaline solution may be applied.

The alkali compound contained in the alkaline solution is not particularly limited, but it may be an inorganic alkaline compound or an organic alkali compound. The solvent of the alkaline solution may be either water or an organic solvent. The solvent is preferably a polar solvent (water, or a polar organic solvent such as alcohol), and more preferably an aqueous solvent containing at least water.

Among alkaline solutions, a sodium hydroxide aqueous solution, or a potassium hydroxide aqueous solution is particularly preferable, because of high versatility.

The temperature of the alkali solution in the alkali treatment step is not particularly limited, but it is preferably 5° C. or higher and 80° C. or lower, and more preferably 10° C. or higher and 60° C. or lower.

The immersion time in the alkali solution in the alkali treatment step is not particularly limited, but it is preferably 5 minutes or more and 30 minutes or less, and more preferably 10 minutes or more and 20 minutes or less.

The amount of the alkali solution used in the alkali treatment is not particularly limited, but it is preferably 100% by mass or more and 100000% by mass or less, and more preferably 1000% by mass or more and 10000% by mass or less, with respect to the absolute dry mass of the ionic substituent-introduced fibers.

In order to reduce the amount of the alkaline solution used in the alkali treatment step, ionic substituent-introduced fibers may be washed with water or an organic solvent before the alkali treatment step. After the alkali treatment, the alkali-treated ionic substituent-introduced fibers are preferably washed with water or an organic solvent before the defibration treatment step, in order to improve the handling property.

<Defibration Treatment>

The ionic substituent-introduced fibers are subjected to a defibration treatment in a defibration treatment step. In the defibration treatment step, fibers are defibrated usually using a defibration treatment apparatus to yield a slurry comprising ultrafine cellulose fibers, and there is no particular restriction on a treatment apparatus, or a treatment method.

A high-speed defibrator, a grinder (stone mill-type crusher), a high-pressure homogenizer, an ultrahigh-pressure homogenizer, a high-pressure collision-type crusher, a ball mill, a bead mill, or the like can be used as the defibration treatment apparatus. Alternatively, for example, a wet milling apparatus such as a disc-type refiner, a conical refiner, a twin-screw kneader, an oscillation mill, a homomixer under high-speed rotation, an ultrasonic disperser, or a beater may also be used as the defibration treatment apparatus. The defibration treatment apparatus is not limited to the above. Examples of a preferred defibration treatment method include a high-speed defibrator, a high-pressure homogenizer, and an ultrahigh-pressure homogenizer, which are less affected by milling media, and are free from apprehension of contamination.

Upon the defibration treatment, the fiber raw material is preferably diluted with water and an organic solvent each alone or in combination, to prepare a slurry, though the method is not particularly limited thereto. Water as well as a polar organic solvent can be used as a dispersion medium. Preferred examples of the polar organic solvent include, but are not particularly limited to, alcohols, ketones, ethers, dimethyl sulfoxide (DMSO), dimethylformamide (DMF), and dimethylacetamide (DMAc). Examples of the alcohols include methanol, ethanol, n-propanol, isopropanol, n-butanol, and t-butyl alcohol. Examples of the ketones include acetone and methyl ethyl ketone (MEK). Examples of the ethers include diethyl ether and tetrahydrofuran (THF). One of these dispersion media may be used, or two or more thereof may be used. The dispersion medium may also contain a solid content other than the fiber raw material, for example, hydrogen-binding urea.

In the present invention, after the ultrafine cellulose fibers have been concentrated and dried, a defibration treatment may be carried out thereon. In this case, there is no particular restriction on the method of concentration and drying, but examples thereof include a method in which a concentrating agent is added into a slurry comprising the ultrafine cellulose fibers, and a method using a dehydrator, a press, a dryer, and the like used generally. Further, publicly known methods, for example as described in WO 2014/024876, WO 2012/107642, and WO 2013/121086, may be used. Moreover, a sheet may be formed from the concentrated ultrafine cellulose fibers. The formed sheet may be pulverized and may be subjected to a defibration treatment.

Examples of a device used for pulverizing the ultrafine cellulose fibers include, but are not particularly limited to, a high-speed defibrator, a grinder (stone mill-type grinder), a high-pressure homogenizer, an ultra-high pressure homogenizer, a high-pressure collision type crusher, a ball mill, a bead mill, a disk type refiner, a conical refiner, a twin screw kneader, a vibrating mill, and a device for wet milling, such as a high-speed rotating homomixer, an ultrasonic disperser, or a beater.

<Optional Components>

The thickener of the present invention preferably consists of the aforementioned ultrafine cellulose fibers and water. However, the present thickener may comprise optional components other than the aforementioned ultrafine cellulose fibers and water. When the thickener comprises optional components, the content of the optional components is preferably 10% by mass or less, more preferably 5% by mass or less, further preferably 2% by mass or less, and particularly preferably 1% by mass or less, with respect to the total mass of the thickener.

Besides, as optional components possibly comprised in the thickener, the same optional components as those possibly comprised in the after-mentioned composition can be exemplified.

(Method for Producing Thickener)

The method for producing the thickener of the present invention preferably comprises a step of performing a yellowing suppression treatment on a dispersion of ultrafine cellulose fibers. It is assumed that, in the present invention, by performing a yellowing suppression treatment on an ultrafine cellulose fiber dispersion, a composition comprising the thickener of the present invention can exhibit excellent light resistance.

The ultrafine cellulose fiber dispersion, on which the yellowing suppression treatment is performed, is an ultrafine cellulose fiber dispersion obtained via the aforementioned <Defibration treatment step>. The solids concentration in this dispersion is preferably 0.1% by mass or more and 20% by mass or less, and more preferably 0.5% by mass or more and 10% by mass or less.

The step of performing a yellowing suppression treatment may be, for example, an electron beam irradiation step. In such an electron beam irradiation step, irradiation of electron beam is applied to an ultrafine cellulose fiber dispersion. In this step, it is preferable that the ultrafine cellulose fiber dispersion is spread on a substrate, and that electron beam is then applied to the ultrafine cellulose fiber dispersion in such a state. The substrate, on which the ultrafine cellulose fiber dispersion is spread, may be, for example, a resin substrate such as a polycarbonate sheet. Upon irradiation of electron beam, the ultrafine cellulose fiber dispersion is preferably in a state in which it is spread to a thickness of 1 mm or more and 20 mm or less. In addition, in order to prevent the transpiration of the ultrafine cellulose fiber dispersion, irradiation of electron beam is preferably carried out immediately after application of the ultrafine cellulose fiber dispersion, and specifically, the irradiation of electron beam is preferably carried out within 1 hour after the application of the ultrafine cellulose fiber dispersion.

In the electron beam irradiation step, electron beam having an acceleration voltage of 0.1 MeV or more and 10.0 MeV or less and an irradiation dose of 1 kGy or more and 100 kGy or less is preferably applied. Among others, the acceleration voltage of the electron beam is more preferably 0.5 MeV or more, and further preferably 1.0 MeV or more. On the other hand, the acceleration voltage of the electron beam is more preferably 5.0 MeV or less, and further preferably 3.0 MeV or less. The irradiation dose of the electron beam is more preferably 3 kGy or more, and further preferably 5 kGy or more. On the other hand, the irradiation dose of the electron beam is more preferably 50 kGy or less, and further preferably 30 kGy or less.

In the electron beam irradiation step, the electron beam is preferably applied multiple times. The number of electron beam irradiations is preferably twice or more and 50 times or less, and more preferably 3 times or more and 20 times or less. Besides, the electron beam irradiation step is preferably carried out under a nitrogen gas environment. Moreover, the device used in the electron beam irradiation step may be, for example, an electron beam irradiation device (manufactured by ESI, Electrocurtain).

In the present embodiment, the method of performing the yellowing suppression treatment or the conditions therefor are highly adjusted, for example, by performing electron beam irradiation multiple times or applying electron beam having a specific range of acceleration voltage, so that a change in the yellowness of the thickener before and after ultraviolet irradiation can be regulated in an appropriate range. This is assumed because the existential state of cellulose fibers or other components comprised in the thickener can be ameliorated by adjusting the method of the yellowing suppression treatment or the conditions therefor, as described above. Further, by highly adjusting the method of the yellowing suppression treatment or the conditions therefor, it also becomes possible to obtain a thickener having an excellent balance among a yellowness change, a viscosity, and a polymerization degree.

After completion of the electron beam irradiation step, the ultrafine cellulose fiber dispersion is recovered. The solids concentration in the recovered ultrafine cellulose fiber dispersion is adjusted, as appropriate. In order to obtain a high-concentration thickener, a condensation step may be established. In order to obtain a low-concentration thickener, a dilution step may be established. Moreover, the recovered ultrafine cellulose fiber dispersion may also be mixed with optional components, solvents, and the like.

(Composition)

The present invention may also relate to a composition comprising the aforementioned thickener and other components. Examples of such other components may include a wax component, a resin component, a hydrophilic polymer, and an organic ion. It is to be noted that a thickener comprising optional components is also referred to as a "composition" in the present description.

The present invention may relate to a composition comprising the aforementioned thickener and a wax component. Examples of the wax component that can be used herein may include various types of commercially available waxes, such as petroleum wax, vegetable wax, animal wax, and low molecular weight polyolefins. Examples of such wax may include: petroleum wax, such as paraffin wax, microcrystalline wax and petrolatum, and a derivative thereof; montan wax and a derivative thereof; hydrocarbon wax prepared according to the Fischer-Tropsch process, and a derivative thereof; polyolefin wax including polyethylene as a typical example, and a derivative thereof; and natural wax such as carnauba wax and candelilla wax, and a derivative thereof. It is to be noted that the aforementioned derivatives also include an oxide, a block copolymer with a vinyl monomer, and a graft denatured product. Other examples of the derivatives may include alcohols such as higher aliphatic alcohol, fatty acids such as stearic acid and palmitic acid, fatty acid amides, fatty acid esters, and hydrogenated castor oil and a derivative thereof. The composition comprising the thickener and the wax component is preferably used, for example, as wax.

When the composition comprises a thickener and a wax component, the content of the wax component comprised in the composition is preferably 0.01% by mass or more and 90% by mass or less, more preferably 0.01% by mass or more and 50% by mass or less, and further preferably 0.01% by mass or more and 10% by mass or less, with respect to the total mass of the composition. By setting the content of the wax component within the above-described range, a composition having excellent light resistance can be obtained.

The present invention may also relate to a composition comprising the aforementioned thickener and a resin component. The resin component is preferably a thermoplastic resin. Examples of the thermoplastic resin include a styrene resin, an acrylic resin, an aromatic polycarbonate resin, an aliphatic polycarbonate resin, an aromatic polyester resin, an aliphatic polyester resin, an aliphatic polyolefin resin, a cyclic olefin resin, a polyamide resin, a polyphenylene ether resin, a thermoplastic polyimide resin, a polyacetal resin, a polysulfone resin, and an amorphous fluorine resin. Such a thermoplastic resin may also be a thermoplastic resin emulsion. Such a composition comprising a thickener and a resin component is preferably used as, for example, a paint.

When the composition comprises a thickener and a resin component, the content of the resin component comprised in the composition is preferably 1% by mass or more and 80% by mass or less, and more preferably 5% by mass or more and 50% by mass or less, with respect to the total mass of the composition.

The composition may comprise, as other components, a hydrophilic polymer or an organic ion. Examples of the hydrophilic polymer may include polyethylene glycol, cellulose derivatives (hydroxyethyl cellulose, carboxyethyl cellulose, carboxymethyl cellulose, etc.), casein, dextrin, starch, modified starch, polyvinyl alcohol, modified polyvinyl alcohol (acetoacetylated polyvinyl alcohol, etc.), polyethylene oxide, polyvinylpyrrolidone, polyvinyl methyl ether, polyacrylates, polyacrylamide, acrylic acid alkyl ester copolymers, and urethane copolymers. Among others, the hydrophilic polymer is preferably at least one type selected from polyethylene glycol (PEG), polyvinyl alcohol (PVA), modified polyvinyl alcohol (modified PVA) or polyethylene oxide (PEO).

Examples of the organic ion may include tetraalkylammonium ions and tetraalkylphosphonium ions. Examples of the tetraalkylammonium ions may include a tetramethylammonium ion, a tetraethylammonium ion, a tetrapropylammonium ion, a tetrabutylammonium ion, a tetrapentylammonium ion, a tetrahexylammonium ion, a tetraheptylammonium ion, a tributylmethylammonium ion, a lauryltrimethylammonium ion, a cetyltrimethylammonium ion, a stearyltrimethylammonium ion, an octyldimethylethylammonium ion, a lauryldimethylethylammonium ion, a didecyldimethylammonium ion, a lauryldimethylbenzylammonium ion, and a tributylbenzylammonium ion. Examples of the tetraalkylphosphonium ions may include a tetramethylphosphonium ion, a tetraethylphosphonium ion, a tetrapropylphosphonium ion, a tetrabutylphosphonium ion, and a lauryltrimethylphosphonium ion. In addition, other examples of the organic ion may include a tetrapropylonium ion and a tetrabutylonium ion, and among others, a tetra-n-propylonium ion and a tetra-n-butylonium ion are particularly preferable.

Moreover, examples of other components may include a filler, a pigment, a dye, an ultraviolet absorber, a perfume, an antiseptic, a surfactant, and an antioxidant.

(Intended Use of Thickener)

The thickener of the present invention can be used for various types of intended uses. For example, a sheet comprising the aforementioned thickener can be formed. This sheet may be formed from a composition comprising the thickener. For example, the thickener of the present invention is mixed with a resin component to obtain a membrane form, or the membrane form is dried, so that various types of sheets can be formed. Thereby, a sheet having high light resistance can be produced. Such a sheet is suitable for intended uses, such as light transmissive substrates for various display devices, various solar cells, and the like. Also, such a sheet is suitable for intended uses, such as substrates of electronic devices, components of consumer electronics, window materials of various types of vehicles or buildings, interior materials, exterior materials, and wrapping materials. Besides, by mixing the thickener of the present invention with a resin component, threads, filters, woven fabrics, buffering materials, sponges, polishing materials, and the like can be formed.

When a sheet comprising the thickener is formed, it is preferable to establish a step of applying a composition comprising the thickener and a resin component onto a substrate. Moreover, it is also possible to form a sheet by subjecting a composition comprising the thickener and a resin component to papermaking.

Furthermore, the thickener of the present invention can also be used as an additive for paints, waxes, food products, excavation underground treatment compositions, cosmetic products, inks, drugs, medical supplies, etc.

EXAMPLES

Hereinafter, the features of the present invention will be described more specifically with reference to Examples and Comparative Examples. The materials, used amounts, proportions, treatment content, treatment procedures, and the like shown in the following Examples can be appropriately changed to the extent that such changes do not depart from the spirit of the present invention. Therefore, the scope of the present invention should not be construed as being limited by the following specific examples.

Example 1

<Production of Phosphoric Acid Group-Introduced Cellulose Fibers>

Pulp manufactured by Oji Paper Co., Ltd. (solid content: 93% by mass, basis weight: 208 g/m², sheet-shaped, Canadian Standard Freeness (CSF) measured according to JIS P 8121 after defibration: 700 ml) was used as needle bleached kraft pulp as a raw material. 100 Parts by mass (absolute dry mass) of the needle bleached kraft pulp were impregnated with a mixed aqueous solution of ammonium dihydrogen phosphate and urea, and were then compressed to result in 49 parts by mass of the ammonium dihydrogen phosphate and 130 parts by mass of the urea, so as to obtain chemical-impregnated pulp. The obtained chemical-impregnated pulp was dried in a dryer of 105° C. for moisture evaporation to pre-dry the chemical-impregnated pulp. Then, the chemical-impregnated pulp was heated in an air-blow dryer set at 140° C. for 10 minutes, so that a phosphoric acid group was introduced into cellulose in the pulp to obtain phosphorylated pulp.

100 g (at a pulp mass) of the obtained phosphorylated pulp was weighed, and 10 L of ion exchange water was then poured onto it, which was then uniformly dispersed by stirring, followed by filtration and dehydration to obtain a dehydrated sheet. This step was repeated twice. Subsequently, the obtained dehydrated sheet was diluted with 10 L of ion exchange water, and then, while stirring, a 1 N aqueous solution of sodium hydroxide was gradually added, so as to obtain a pulp slurry having a pH value of 12 or more and 13 or less. Thereafter, this pulp slurry was dehydrated to obtain a dehydrated sheet, and 10 L of ion exchange water was then added onto it, which was then uniformly dispersed by stirring, followed by filtration and dehydration to obtain a dehydrated sheet. This step was repeated twice. The infrared absorption spectrum of the obtained dehydrated sheet was measured by FT-IR. As a result, absorption based on the phosphoric acid group was observed in the range of 1230 cm$^{-1}$ or more and 1290 cm$^{-1}$ or less, and thus, addition of the phosphoric acid group was confirmed.

<Defibration Treatment>

Ion exchange water was added to the obtained dehydrated sheet to prepare a slurry having a solids concentration of 2.2% by mass. This slurry was treated at a pressure of 245 MPa, using a wet pulverizing device (manufactured by Sugino Machine Limited; Ultimizer) three times to obtain an ultrafine cellulose fiber dispersion A.

<Measurement of Amount of Substituent>

The amount of the substituent introduced is the amount of a phosphoric acid group introduced into a fiber raw material. The greater this value, the more the phosphoric acid groups that are introduced therein. The amount of the substituent introduced was measured by diluting the target ultrafine cellulose fibers with ion exchange water to have a content of 0.2% by mass, followed by a treatment with an ion exchange resin or titration using an alkali. In the treatment with an ion exchange resin, a strongly acidic ion exchange resin (Amberjet 1024; Organo Corp.; conditioning agent) was added at a volume ratio of 1/10 to the slurry containing 0.2% by mass of ultrafine cellulose fibers, followed by a stirring treatment for 1 hour. Then, the suspension was poured onto a mesh having an opening of 90 µm, so that the slurry was separated from the resin. In the titration using an alkali, a 0.1 N sodium hydroxide aqueous solution was added to the slurry containing the ultrafine cellulose fibers after the ion exchange, which change in the value of electrical conductivity exhibited by the slurry was measured. Specifically, the amount of the alkali (mmol) required for the first region in the curve shown in FIG. 1 (phosphoric acid group) was divided by the solid content (g) in the slurry to be titrated to determine the amount of the substituent introduced (mmol/g). As a result of the calculation, the amount of the phosphoric acid group introduced was found to be 1.00 mmol/g.

<Measurement of Fiber Width>

The fiber width of ultrafine cellulose fibers was measured by the following method.

A supernatant of the ultrafine cellulose fiber dispersion A was diluted with water to a solids concentration of 0.01% by mass or more and 0.1% by mass or less, and the obtained solution was then added dropwise onto a hydrophilized carbon grid film. After drying, it was stained with uranyl acetate, and was then observed under a transmission electron microscope (manufactured by JEOL; JEOL-2000EX). As a result, it was confirmed that the ultrafine cellulose fibers became ultrafine cellulose fibers having an average fiber width of approximately 4 nm. Moreover, the fiber width of the obtained cellulose fibers was 8 nm or less.

<Irradiation of Electron Beam>

Ion exchange water was added to the ultrafine cellulose fiber dispersion A to prepare a slurry having a solids concentration of 2.0% by mass. Subsequently, the slurry was applied onto a polycarbonate sheet (manufactured by TEIJIN LIMITED, Panlite PC-2151, thickness: 300 µm) cut into an A4 size, using a film applicator (clearance: 3 mm, applied width: 150 mm). Using an electron beam irradiation apparatus (manufactured by ESI, Electrocurtain), the slurry-applied polycarbonate sheet was immediately irradiated with an electron beam with an acceleration voltage of 1.0 MeV and an irradiation dose of 10 kGy under a nitrogen gas environment, five times. During this operation, the upper surface side as an irradiated surface was set to be a surface onto which the slurry is applied. Thereafter, the slurry was recovered from the surface of the polycarbonate sheet, and was then used as a slurry to be evaluated (thickener).

Example 2

The acceleration voltage was set to be 0.5 MeV in <Irradiation of electron beam> of Example 1. A slurry to be evaluated (thickener) was obtained by the same procedures as those of Example 1 except for the aforementioned condition.

Example 3

The number of electron beam irradiations was set to be 10 times in <Irradiation of electron beam> of Example 1. A slurry to be evaluated (thickener) was obtained by the same procedures as those of Example 1 except for the aforementioned condition.

Example 4

In <Production of phosphoric acid group-introduced cellulose fibers> of Example 1, the step of introducing a phosphoric acid group into the obtained dehydration sheet and the step of filtrating and dehydrating the sheet were carried out again on the obtained dehydration sheet, so as to obtain a dehydration sheet of two-time phosphorylated cellulose. The amount of the phosphoric acid group introduced into the ultrafine cellulose fibers in the ultrafine cellulose fiber dispersion A obtained from this dehydrated sheet was 1.50 mmol/g. A slurry to be evaluated (thickener) was obtained by the same procedures as those of Example 1 except for the aforementioned condition.

Example 5

In Example 1, the after-mentioned ultrafine cellulose fiber dispersion B was used instead of the ultrafine cellulose fiber dispersion A. A slurry to be evaluated (thickener) was obtained by the same procedures as those of Example 1 except for the aforementioned condition. It is to be noted that the ultrafine cellulose fiber dispersion B was produced as follows.
<TEMPO Oxidation>

Pulp manufactured by Oji Paper Co., Ltd. (solid content: 93% by mass, basis weight: 208 g/m$^2$, sheet-shaped, Canadian Standard Freeness (CSF) measured according to JIS P 8121 after defibration: 700 ml) was used as needle bleached kraft pulp as a raw material. 100 Parts by mass (absolute dry mass) of the needle bleached kraft pulp, 1.25 parts by mass of TEMPO (2,2,6,6-tetramethylpiperidine I-oxyl), and 12.5 parts by mass of sodium bromide were dispersed in 10000 parts by mass of water. Subsequently, an aqueous solution containing 13% by mass of sodium hypochlorite was added thereto, such that the amount of sodium hypochlorite became 8.0 mmol with respect to 1.0 g of the pulp, to start reaction. During the reaction, the pH was kept at pH 10 or more and pH 11 or less by the dropwise addition of a 0.5 M sodium hydroxide aqueous solution. The point in time when change in pH was no longer seen was considered to be completion of the reaction.
<Washing of TEMPO-Oxidized Pulp>

Thereafter, this pulp slurry was dehydrated to obtain a dehydrated sheet, and 5000 parts by mass of ion exchange water was poured onto the pulp, which was then uniformly dispersed by stirring, and then, filtration and dehydration were performed on the resultant to obtain a dehydrated sheet. This step was repeated twice.
<Defibration Treatment>

Ion exchange water was added to the obtained dehydrated sheet to prepare a slurry having a solids concentration of 2.2% by mass. This slurry was treated at a pressure of 245 MPa using a wet pulverizing device (manufactured by Sugino Machine Limited; Ultimizer) five times to obtain an ultrafine cellulose fiber dispersion B.
<Measurement of Amount of Substituent>

The amount of the substituent (carboxyl group) introduced was measured by diluting the target ultrafine cellulose fibers with ion exchange water to have a content of 0.2% by mass, followed by a treatment with an ion exchange resin or titration using an alkali. In the treatment with an ion exchange resin, a strongly acidic ion exchange resin (Amberjet 1024; Organo Corp.; conditioning agent) was added at a volume ratio of 1/10 to 0.2% by mass of the ultrafine cellulose fiber dispersion B, followed by a stirring treatment for 1 hour. Then, the suspension was poured onto a mesh having an opening of 90 μm, so that the resin was separated from the dispersion. Then, the dispersion was subjected to the titration using an alkali. In the titration using an alkali, the amount of the alkali (mmol) required for the first region in the curve shown in FIG. 2 (carboxyl group) was divided by the solid content (g) in the slurry to be titrated to determine the amount of the substituent introduced (mmol/g). The amount of the substituent (carboxyl group) introduced was measured to be 1.0 mmol/g according to the titration method.

Example 6

In <Irradiation of electron beam> of Example 1, upon addition of ion exchange water, carnauba wax was added to result in 2.0% by mass of ultrafine cellulose fibers, 0.5% by mass of carnauba wax, and 97.5% by mass of water. Other procedures were performed in the same manner as that of Example 1, so as to obtain a slurry to be evaluated (thickener).

Comparative Example 1

In Example 1, <Irradiation of electron beam> was not carried out. Other procedures were performed in the same manner as that of Example 1, so as to obtain a slurry to be evaluated (thickener).

Comparative Example 2

In Example 4, <Irradiation of electron beam> was not carried out. Other procedures were performed in the same manner as that of Example 4, so as to obtain a slurry to be evaluated (thickener).

Comparative Example 3

In Example 5, <Irradiation of electron beam> was not carried out. Other procedures were performed in the same manner as that of Example 5, so as to obtain a slurry to be evaluated (thickener).
<Measurements>

The slurry to be evaluated, which had been obtained in each of the Examples and Comparative Examples, was measured according to the following methods.
[Amount of Change in Yellowness of Slurry Before and after Ultraviolet Irradiation]

The slurry to be evaluated was filled in a colorless and transparent glass cell (manufactured by Fujiwara Scientific Co., Ltd.; MG-40; inverse optical path) having an inside dimension of 1 cm in depth×4 cm in width×4.5 cm in height, and a polyester-made adhesive tape was attached to the glass cell, so that the injection port (a surface composed of depth×width) was covered and sealed with the tape. Subsequently, this glass cell was fixed in a tank of a weathermeter (manufactured by Suga Test Instruments Co., Ltd., Super Xenon Weather Meter SX75), and the glass cell was then irradiated with ultraviolet rays with a wavelength of 300 nm or more and 400 nm or less from the side of the maximum area of the glass cell (a surface composed of height×width), thereby resulting in an irradiance of 180 W/m$^2$ and an integrated light amount of 500 mJ/m$^2$.

The yellowness of the slurry to be evaluated before and after ultraviolet irradiation was measured in accordance with JIS K 7373. Upon the measurement of the yellowness, the slurry to be evaluated before and after ultraviolet irradiation was filled in a colorless and transparent glass cell having an inside dimension of 1 cm in depth×4 cm in width×4.5 cm in height, and then, using Colour Cute i (manufactured by Suga Test Instruments Co., Ltd.), the glass cell was fixed in the device, with the injection port of the glass cell (a surface composed of depth×width) facing up. Then, the yellowness was measured at an optical path length of 1 cm. It is to be noted that the measurement of zero point was carried out with ion exchange water filled in the same glass cell as that described above. From the yellowness of the slurry to be evaluated before and after ultraviolet irradiation, the amount of a change in the yellowness of the slurry was calculated according to the following equation:

Amount of change in yellowness of slurry before and after ultraviolet irradiation=(yellowness of slurry after ultraviolet irradiation)−(yellowness of slurry before ultraviolet irradiation).

[Amount of Change in Yellowness of Film Before and after Ultraviolet Irradiation]

Ion exchange water was added to the slurry to be evaluated (thickener) to prepare a diluted solution A having a solids concentration of 0.5% by mass. Subsequently, Polyethylene Oxide (manufactured by Wako Pure Chemical Industries, Ltd.; molecular weight: 4,000,000) was diluted with ion exchange water to prepare a diluted solution B having a solids concentration of 0.5% by mass. Thereafter, the two types of diluted solutions were mixed with each other to result in 100 parts by mass of the diluted solution A and 40 parts by mass of the diluted solution B, thereby obtaining a mixed solution. Subsequently, 113 g of the mixed solution was poured into a polystyrene-made petri dish with an inner diameter of 12 cm, and was then left at rest in a constant-temperature bath (dryer) at 50° C. for 24 hours. Thereafter, the formed film was peeled from the polystyrene-made petri dish. By the aforementioned procedures, a film having a basis weight of 50 g/m$^2$ was obtained. Subsequently, this film was fixed in a tank of a weathermeter (manufactured by Suga Test Instruments Co., Ltd., Super Xenon Weather Meter SX75), and the glass cell was then irradiated with ultraviolet rays with a wavelength of 300 nm or more and 400 nm or less, thereby resulting in an irradiance of 180 W/m$^2$ and an integrated light amount of 500 mJ/m$^2$.

The yellowness of the film before and after ultraviolet irradiation was measured in accordance with JIS K 7373. For the measurement, Colour Cute i (manufactured by Suga Test Instruments Co., Ltd.) was used. From the yellowness of the film before and after ultraviolet irradiation, the amount of a change in the yellowness of the film was calculated according to the following equation:

Amount of change in yellowness of film before and after ultraviolet irradiation=(yellowness of film after ultraviolet irradiation)−(yellowness of film before ultraviolet irradiation).

[Haze]

Ion exchange water was poured onto the slurry to be evaluated, so as to prepare a diluted solution having a solids concentration of 0.2% by mass. Thereafter, the diluted solution was left at rest under the environment of 25° C. for 16 hours or more, and the haze was then measured in accordance with JIS K 7136 using a haze meter (manufactured by MURAKAMI COLOR RESEARCH LABORATORY Co., Ltd., HM-150). Upon the measurement, the diluted solution was placed in a glass cell for liquid having an optical path length of 1 cm (manufactured by Fujiwara Scientific Company Co., Ltd., MG-40, inverse optical path). It is to be noted that the measurement of zero point was carried out with ion exchange water filled in the same glass cell as that described above.

[Viscosity]

Ion exchange water was poured onto the slurry to be evaluated, so as to prepare a diluted solution having a solids concentration of 0.4% by mass. Thereafter, the diluted solution was left at rest under the environment of 25° C. for 16 hours or more, and was then rotated using a Type B Viscometer (No. 3 Rotor) (manufactured by BROOKFIELD, analog viscometer T-LVT) at 25° C. at a rotation number of 3 rpm for 3 minutes, so as to measure the viscosity of the diluted solution.

[pH]

Ion exchange water was poured onto the slurry to be evaluated, so as to prepare a diluted solution having a solids concentration of 0.4% by mass. Thereafter, the diluted solution was left at rest under the environment of 25° C. for 16 hours or more, and then, the pH of the diluted solution was measured at 25° C., using a pH meter (manufactured by HORIBA Ltd., LAQUAact).

[Shear Viscosity at 1 s$^{-1}$ and 100 s$^{-1}$]

Ion exchange water was poured onto the slurry to be evaluated, so as to prepare a diluted solution having a solids concentration of 0.5% by mass. The temperature in the measurement environment was set at 25° C., and the diluted solution was placed on a measurement board of a rheometer (manufactured by Haake, Rheo Stress 1). The shear viscosity was continuously measured at a shear velocity from 0.01 s$^{-1}$ to 100 s$^{-1}$. The values of the shear viscosity at 1 s$^{-1}$ and 100 s$^{-1}$ were obtained.

[Polymerization Degree of Ultrafine Cellulose Fibers]

The polymerization degree of ultrafine cellulose fibers contained in the slurry to be evaluated was measured in accordance with Tappi T230. Specifically, the ultrafine cellulose fibers as a measurement target were dispersed in a dispersion medium, the viscosity thereof was then measured (defined as η1), and the blank viscosity was then measured using only the dispersion medium (defined as η0). Thereafter, a specific viscosity (ηsp) and an intrinsic viscosity ([η]) were calculated according to the following equations.

$$\eta sp = (\eta 1/\eta 0) - 1$$

$$[\eta] = \eta sp/(c(1+0.28 \times \eta sp))$$

In the above equation, c indicates the concentration of ultrafine cellulose fibers upon the measurement of the viscosity.

Further, the polymerization degree (DP) of the ultrafine cellulose fibers was calculated according to the following equation.

$$DP = 1.75 \times [\eta].$$

Since this polymerization degree is an average polymerization degree measured according to a viscosity method, it is also referred to as a "viscosity average polymerization degree" in some cases. It is to be noted that the polymerization degree of the slurry to be evaluated obtained in Example 6 was not measured because it was determined that accurate measurement was impossible due to the presence of carnauba wax.

<Evaluation>

The slurry to be evaluated obtained in each of the Examples and Comparative Examples was evaluated according to the following method.

[Stability Over Time of Paint Model]

Ion exchange water and acrylic emulsion (manufactured by DIC, BONKOTE MAT-200-E) were added to the slurry to be evaluated, so as to prepare a paint model comprising 0.5% by mass of ultrafine cellulose fibers, 20% by mass of acrylic emulsion and 79.5% by mass of water. Subsequently, the paint model was filled in a polypropylene-made bottle (transparent type, volume: 1 L, 96 mm in body diameter× 198 mm in overall height), and was then left at rest under the environment of a temperature of 25° C. and no direct sunlight for 180 days. After the paint model had been left at rest, the appearance thereof was observed, and the light resistance of the paint model was evaluated according to the following criteria.

⊙: Yellow or brown color is not observed.
○: Yellow or brown color is slightly observed.
x: Yellow or brown color is clearly observed.

[Stability Over Time of Coating Film Model]

The above-described paint model was applied onto a PET film (manufactured by Toray Industries, Inc., Lumirror S10, thickness: 250 μm), using a film applicator (clearance: 1 mm, coating width: 150 mm). Subsequently, after completion of the application, the PET film was dried with a dryer at 100° C. for 1 hour, so that volatile components were volatilized, thereby obtaining a laminate consisting of the coating film model and the PET film. Thereafter, the laminate was left at rest under the environment of a temperature of 25° C. and no direct sunlight for 180 days. After the laminate had been left at rest, the appearance of the coating film model was observed, and the light resistance of the coating film model was evaluated according to the following criteria.

⊙: Yellow or brown color is not observed.
○: Yellow or brown color is slightly observed.
x: Yellow or brown color is clearly observed.

As is apparent from Table 1, in the case of the slurry obtained in each of the Examples, the amount of a change in the yellowness of each slurry was small after the ultraviolet irradiation. In addition, in the case of the film obtained from the slurry obtained in each of the Examples, the amount of a change in the yellowness of each film was small after the ultraviolet irradiation. As a result, the paint models and the coating film models had excellent light resistance. Moreover, the slurries obtained in the Examples had excellent light resistance and also, could realize high viscosity and high polymerization degree.

On the other hand, in the Comparative Examples, both the amount of a change in the yellowness of the slurry before and after the ultraviolet irradiation, and the amount of a change in the yellowness of the coating film before and after the ultraviolet irradiation, became high, and as a result, the light resistance of the paint models and the coating film models was decreased.

The invention claimed is:

1. A thickener comprising cellulose fibers having a fiber width of 8 nm or less and water, wherein
    the thickener is a slurry or a gel,
    a diluted solution of the thickener having a solids concentration of 0.5% by mass has a shear viscosity of 3000 mPa·s or more at 25° C. and at a shear velocity of 1 s$^{-1}$,
    a polymerization degree of the cellulose fibers having a fiber width of 8 nm or less is 280 or more, and
    when the thickener is filled in a colorless and transparent glass cell having an inside dimension of 1 cm in depth×4 cm in width×4.5 cm in height and the thickener is then irradiated with ultraviolet rays with a wavelength of 300 nm or more and 400 nm or less, using a xenon lamp, from the side of the maximum area surface of the glass cell, so as to be an irradiance of 180 W/m$^2$ and an integrated light amount of 500 mJ/m$^2$,

TABLE 1

| | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|
| Content (% by mass) | 2.0 | 2.0 | 9.0 | 2.0 | 2.0 | 2.0 | 2.0 | 2.0 | 2.0 |
| Substituent | Phosphoric acid group | Phosphoric acid group | Phosphoric acid group | Phosphoric acid group | Carboxyl group | Phosphoric acid group | Phosphoric acid group | Phosphoric acid group | Carboxyl group |
| Introduced substituent amount (mmol/g) | 1.0 | 1.0 | 1.0 | 1.5 | 1.0 | 1.0 | 1.0 | 1.5 | 1.0 |
| Water content (% by mass) | 98.0 | 98.0 | 98.0 | 98.0 | 98.0 | 97.5 | 98.0 | 98.0 | 98.0 |
| Content of other components (% by mass) | 0.0 | 0.0 | 0.0 | 0.0 | 0.0 | 0.5 | 0.0 | 0.0 | 0.0 |
| Change in yellowness of slurry before and after ultraviolet in-adiation | 4 | 8 | 3 | 5 | 7 | 4 | 19 | 14 | 15 |
| Change in yellowness of film before and after ultraviolet irradiation | 0.8 | 2 | 0.6 | 2 | 3 | 0.8 | 6 | 7 | 9 |
| Haze (%) | 0.5 | 0.3 | 0.8 | 0.4 | 2.3 | 1.0 | 0.4 | 0.3 | 2.5 |
| Viscosity (mPa · s) | 20000 | 25000 | 18000 | 25000 | 9000 | 18000 | 22000 | 26000 | 10000 |
| pH | 9.0 | 9.0 | 9.0 | 9.3 | 7.1 | 8.9 | 9.0 | 9.3 | 7.0 |
| Light resistance of model paint | ⊙ | ○ | ⊙ | ○ | ○ | ⊙ | x | x | x |
| Light resistance of model coating film | ⊙ | ○ | ⊙ | ○ | ○ | ⊙ | x | x | x |
| Shear viscosity (mPa · s) at 1 s$^{-1}$ | 14840 | 15946 | 13250 | 15240 | 9235 | 13858 | 16839 | 15841 | 9840 |
| Shear viscosity (mPa · s) at 100 s$^{-1}$ | 615 | 658 | 515 | 635 | 453 | 600 | 683 | 678 | 475 |
| Polymerization degree ultrafine cellulose fibers | 501 | 512 | 498 | 498 | 428 | — | 520 | 510 | 448 | the amount of a change in the yellowness before and after ultraviolet irradiation measured in accordance with JIS K 7373 is 10 or less.

2. The thickener according to claim 1, wherein a diluted solution of the thickener having a solids concentration of 0.5% by mass has a shear viscosity of 250 mPa·s or more at 25° C. and at a shear velocity of 100 s$^{-1}$.

3. The thickener according to claim 1, wherein
when a film obtained in the following Procedure (a) is irradiated with ultraviolet rays with a wavelength of 300 nm or more and 400 nm or less, using a xenon lamp, from the side of one surface of the film, so as to be an irradiance of 180 W/m$^2$ and an integrated light amount of 500 mJ/m$^2$,
the amount of a change in the yellowness before and after ultraviolet irradiation measured, in accordance with JIS K 7373 is 5 or less:
(Procedure (a))
the thickener is diluted with ion exchange water to a concentration of 0.5% by mass, so as to produce a diluted solution A; polyethylene glycol having a weight average molecular weight of 4,000,000 is diluted with ion exchange water to a concentration of 0.5% by mass, so as to produce a diluted solution B; 100 parts by mass of the diluted solution A is mixed with 40 parts by mass of the diluted solution B to prepare a mixed solution; 113 g of the mixed solution is poured into a polystyrene-made petri dish having an inner diameter of 12 cm, and the petri dish is then left at rest in a constant-temperature bath at 50° C. for 24 hours, and thereafter, the formed film is peeled from the polystyrene-made petri dish.

4. The thickener according to claim 1, wherein the cellulose fibers comprise ionic substituents.

5. The thickener according to claim 1, wherein
when the thickener is processed into a slurry having a solids concentration of 0.4% by mass, which is then left at rest under the environment of 25° C. for 16 hours,
a measured pH of the slurry is pH 6 or more and pH 10 or less.

6. The thickener according to claim 1, wherein the total content of the cellulose fibers and the water is 90% by mass or more, with respect to the total mass of the thickener.

7. The thickener according to claim 1, wherein
when the thickener is processed into a slurry having a solids concentration of 0.2% by mass, which is then left at rest under the environment of 25° C. for 16 hours,
a haze of the slurry, which is measured in accordance with JIS K 7136, is 20% or less.

8. The thickener according to claim 1, wherein
when the thickener is processed into a slurry having a solids concentration of 0.4% by mass, which is then left at rest under the environment of 25° C. for 16 hours,
a viscosity of the slurry, which is measured by rotating at 25° C. at a rotation number of 3 rpm for 3 minutes, using a type B viscometer, is 3000 mPa·s or more.

9. A composition comprising the thickener according to claim 1.

10. The composition according to claim 9, further comprising a resin component.

11. A sheet comprising the thickener according to claim 1.

* * * * *